United States Patent [19]
Dennstedt

[11] Patent Number: 5,217,330
[45] Date of Patent: Jun. 8, 1993

[54] ADJUSTABLE CUTTING TOOL INSERT ASSEMBLY

[76] Inventor: Jack W. Dennstedt, 11408 Jonquil, Coon Rapids, Minn. 55433

[21] Appl. No.: 872,900

[22] Filed: Apr. 22, 1992

[51] Int. Cl.$^5$ ............................................. B23C 5/24
[52] U.S. Cl. ........................................ 407/37; 407/45; 407/87; 408/181; 408/185
[58] Field of Search .................. 407/36–39, 407/44, 45, 85–87; 408/147, 153, 179, 181, 185

[56] References Cited

U.S. PATENT DOCUMENTS

| | | | |
|---|---|---|---|
| 3,205,559 | 9/1965 | Greenleaf | 407/36 |
| 3,662,444 | 5/1972 | Erkfritz | 407/37 X |
| 4,602,899 | 7/1986 | Vig | 408/154 X |
| 4,850,757 | 7/1989 | Stashko | 408/179 |

FOREIGN PATENT DOCUMENTS 2651703  3/1991  France ................................. 408/153

*Primary Examiner*—Steven C. Bishop
*Attorney, Agent, or Firm*—Joel D. Skinner

[57] ABSTRACT

A machining tool for adjustably securing a replaceable cutting member thereto. A tool head is provided with a flat ledge portion at one end, a positioning screw assembly for adjusting the position of a cutting member on the flat ledge portion, and a securement screw assembly for securing the cutting member to the tool head.

1 Claim, 4 Drawing Sheets

ADJUSTABLE CUTTING TOOL INSERT ASSEMBLY

BACKGROUND OF THE INVENTION

This invention relates to machine tool securement and fastening systems and particularly to a securement system for use with replacable machine tool cutting inserts. The invention is particularly useful for adjustably securing the cutting inserts of various cutting tools used in the machining industry.

Boring bars, porting tools, turning tools and other cutting means are used in the machining industry to cut apertures and surfaces in metal or other work pieces in the construction of machine parts. These cutting devices are relatively expensive and prone to wear out over time due to frictional forces generated by contact with, and the cutting of solid metal work pieces. Therefore, they are typically configured to have a replaceable cutting member or insert. In some tools, such as the boring bar, the entire head portion or end is replacable as well. This invention deals particularly with an adjustable securement system for replaceable inserts on either fixed or replaceable tool heads of machine tools.

Replacable cutting inserts are typically fixed to the working end or head of the tool and contact the work piece for cutting and boring purposes. Such inserts are typically constructed of a carbide material or the like. Although various types of boring and porting structures are known and used, their configurations are generally similar in nature. The carbide inserts typically have a quadrilateral or triangular configuration, and are typically screwed into a threaded aperture in the head of the structure.

However, this structure has significant limitations with respect to long term effectiveness of the tool in use. Specifically, the tolerances required by the cutting inserts are typically approximately plus or minus 0.003 inches (0.008 cm.) and, thus, they must be securely held in place so that the cutting edge of the insert does not move, particularly under the stresses encountered in the cutting environment. Also, because wear on the insert is inevitable and deleterious to precision machining processes, it would be advantageous if the position of the insert is adjustable to accommodate for such wear. And further, it would be advantageous if such securement and adjustment is easily accomplished by the machinist. However, the structures known in the prior art typically fall short of these needs. Such structures typically do not provide for ease of attachment and therefor are difficult to use. Also, such structures often do not provide for a secure attachment and therefore, are either prone to frequent failure or require frequent inspection and retightening. Finally, prior art structures do not provide for position adjustment, and therefore require frequent insert replacement due to normal wear of cutting surfaces.

Despite the need for an adjustable securement structure in the art which overcomes the limitations and shortcomings of the prior art, none insofar as is known has been proposed or developed. Accordingly, it is an object of the present invention to provide a cutting insert securement structure which securely fastens and holds a removable cutting insert in an operative orientation on a machine tool, which may be adjusted, and which securement and adjustment is easily accomplished by the machinist.

SUMMARY OF THE INVENTION

The present invention provides an adjustable securement system for use with a machining tool head, for securely and adjustably positioning an insertable cutting member thereon. A tool head is provided with a flat ledge portion at one end, an axial securement screw to secure a cutting member onto the flat ledge portion, and adjustable locking means for fixing the cutting member in the secured position to the ledge portion. The axial securement screw is inserted through an axial aperture in the insert and which is then threaded into a threaded aperture in the ledge portion. An adjustable locking screw with a tapered end is disposed adjacent the cutting member for adjustment and locking purposes. Importantly, the threaded aperture in the tool head ledge is constructed and arranged to be slightly off-center with respect to the normal axis of the insert axial aperture. Hence, the aperture in the cutting member does not precisely line up with the threaded aperture in the ledge when the insert is initially placed thereon. Upon application of force by tightening the securement screw therein, the insert is urged in a predetermined inward direction by this off-center, tapered structure. The adjustment and locking screw, which has a tapered contact end, is initially actuated to provide proper placement or special adjustment of the carbide insert relative to the remaining structure. Then, the axial securement screw is tightened to hold the carbide insert against the locking screw.

These and other benefits of this invention will become clear from the following description by reference to the drawings.

DESCRIPTION OF THE PREFERRED EMBODIMENT

Figure 1:
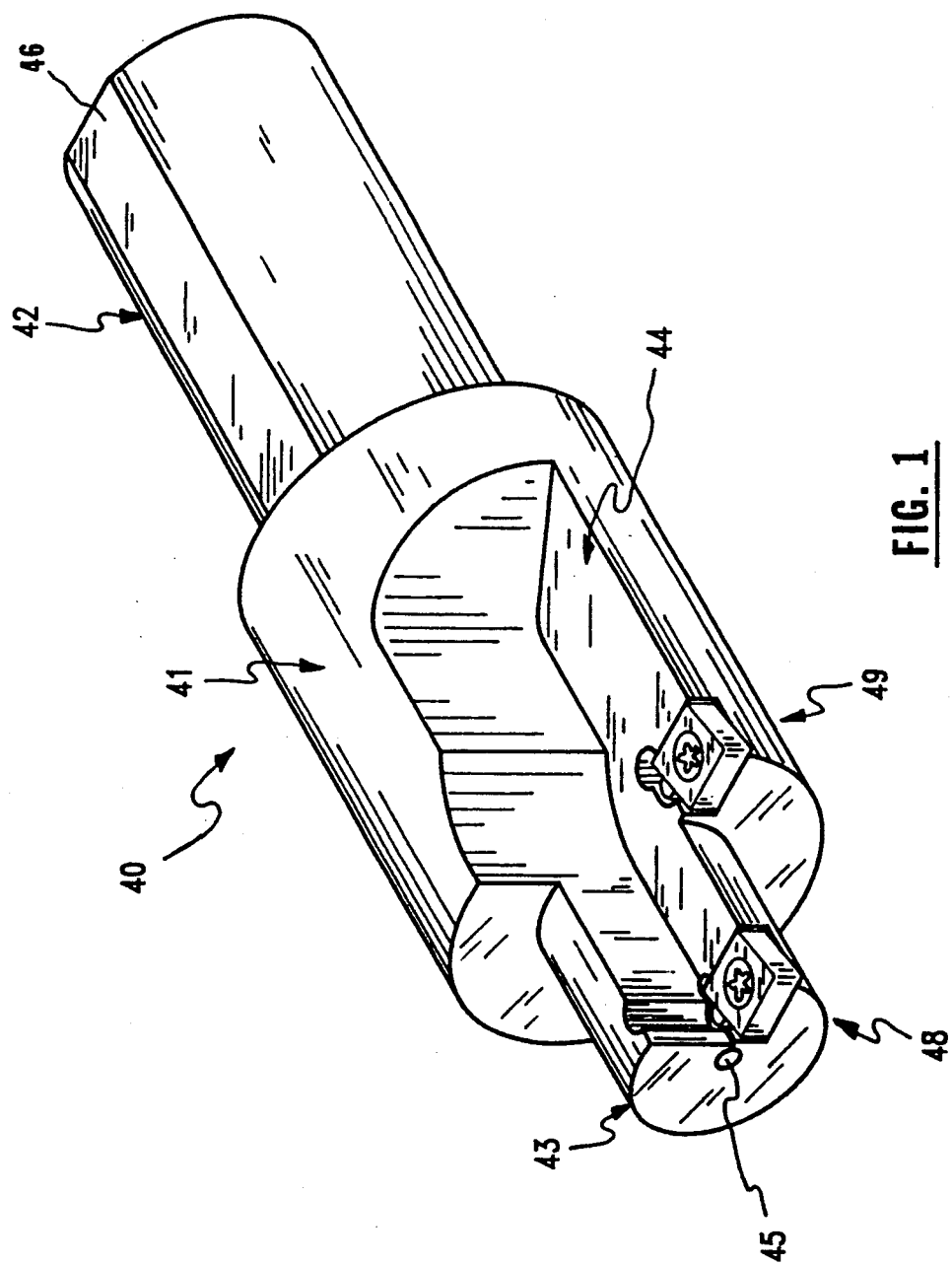
FIG. 1 is a perspective view of a porting tool head showing a particular embodiment of the adjustable insert securement assembly of the present invention.

The present invention provides a tool head structure, useful for securing replacable, carbide cutting member inserts to a machine tool such as a boring bar or porting tool, for example. Since the cutting surfaces of the inserts wear down over time, due to use, and since such wear is detrimental to proper and precise tool function, they previously had to be replaced often. However, the present invention provides adjustable securement such that the normal wear on the insert cutting surface no longer requires that the insert be discarded after a short period of time. Instead the cutting edge position may simply be repositioned to accommodate for wear and maintain precision cutting tolerances. Also, since high forces are encountered on the cutting member during use, the adjustable means of attachment is extremely secure in order to maintain useable cutting tolerances. In summary, the system of this invention provides for ease of attachment of the cutting member insert, and adjustable positioning while maintaining a secure attachment during use.

The drawing figures show a cutting tool structure and arrangement, which utilizes a cutting insert constructed of carbide or the like, a placement surface or notch on the cutting head, and cooperating adjustable securement means. The carbide insert is adjustably and securely held in an operative orientation on the cutting head. Important features of the inventive structure include an off-center threaded hole in the insert through which extends an axial securement screw to a threaded aperture in the head, and a tapered adjustable locking screw.

Figure 3:
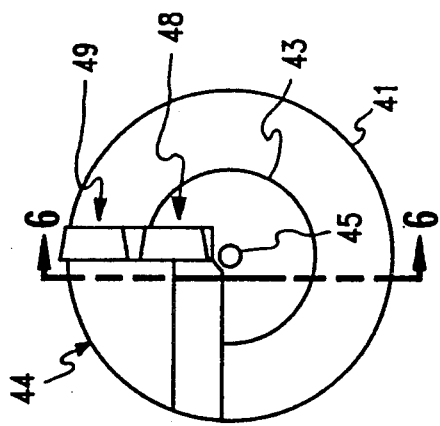
FIG. 3 is an end view of the porting tool head of FIG. 1.
Figure 2:
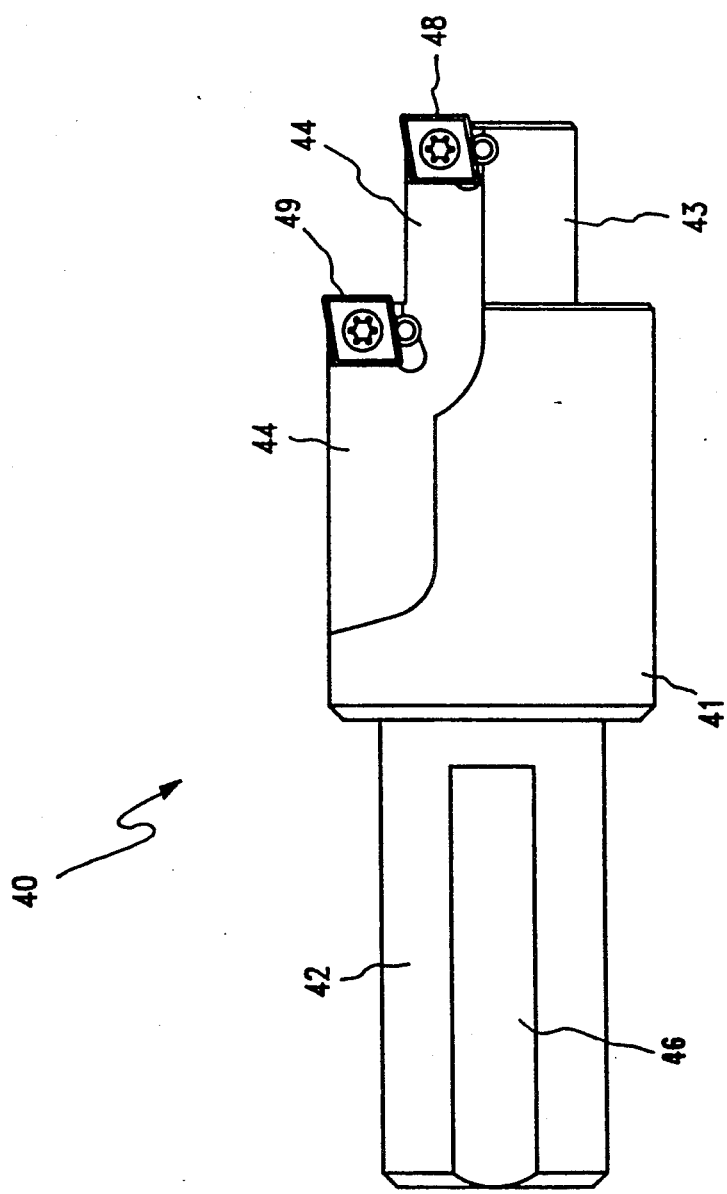
FIG. 2 is a top plan view of the porting tool head of FIG. 1.

Referring to FIGS. 1–3, a common porting tool assembly 40 is used in the machining industry to bore circular structures, apertures and the like into metal work pieces. The porting tool 40 has a head portion 41 located at its working end, from which extends an elongated shank 42, of a substantially circular cross-sectional configuration, including a flat locking surface 46 for connection to the drive mechanism of a milling machine or the like. The head 41 has a cylindrical end extension 43 disposed at its opposite end. An axial aperture 45 is disposed in the end extension 43. A recess 44 of a predetermined configuration is formed into both the head 41 and the end extension 43 to direct cut metal away from the working surfaces of the tool 40 during use. A first (or interior) and a second (or exterior) cutting member or insert 48 and 49 ar shown disposed at predetermined near-circumferential locations to, in conjunction with the recess 44, form a predetermined porting configuration. Although a particular porting configuration is shown with two cutting members 48 and 49, the teachings of this invention are applicable to diverse other tool configurations using at least one cutting member.

Figure 4:
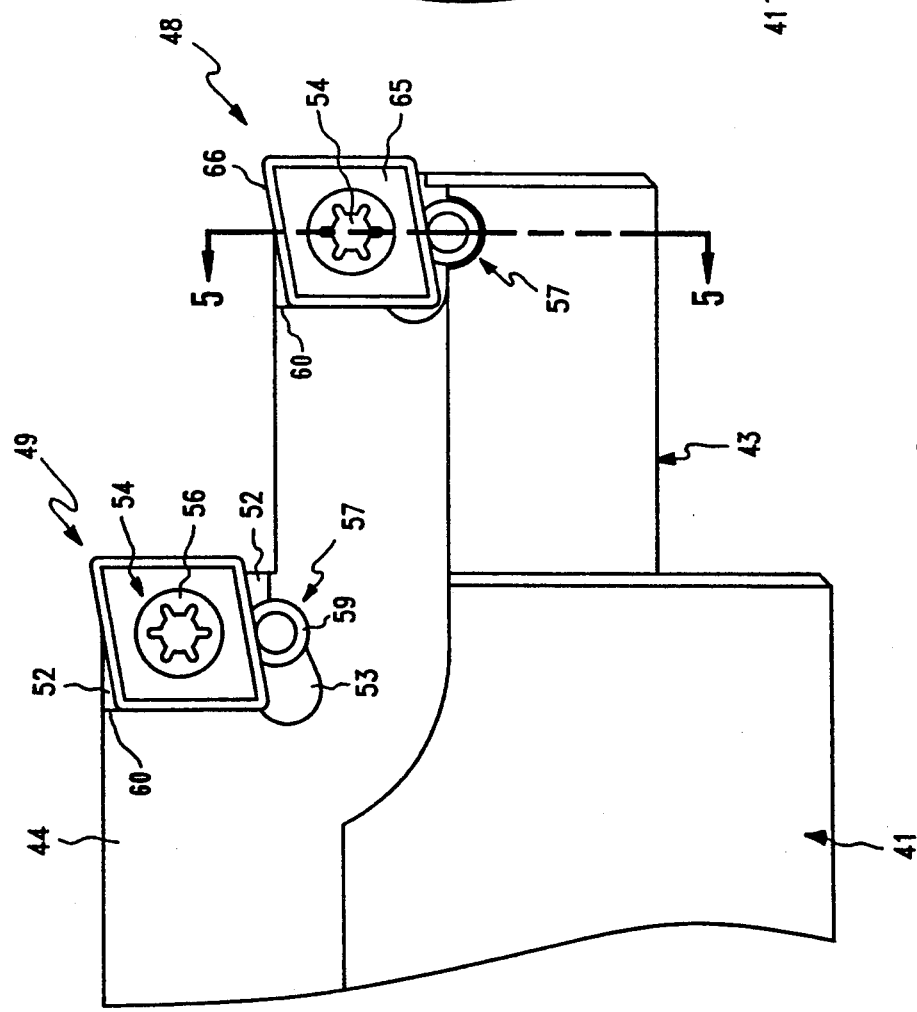
FIG. 4 is an enlarged top view of the porting tool head of FIG. 1.

Referring also to FIG. 4, each cutting member 48 and 49 is shown to have a generally quadrilateral configuration with peripheral side walls which are shown to be angled outwardly approximately 10 degrees relative to a longitudinal plane of the structure. Each cutting member 48 and 49 is disposed on a placement notch or ledge 52 which is disposed in recess 44. Each placement notch 52 has vertical and horizontal dimensions generally equivalent to those of its respective cutting member 48 or 49 so that the cutting member 48 or 49 contacts a back edge wall 60 thereof, except that a portion 61 of the edge of the cutting member 48 or 49 extends beyond the open, outward ledge area for contact with a work piece. An adjustment notch 53 is disposed in the back corner of the placement notch 52 to allow adjustment of the cutting member 48 or 49 position during insertion and securement.

Figure 5:
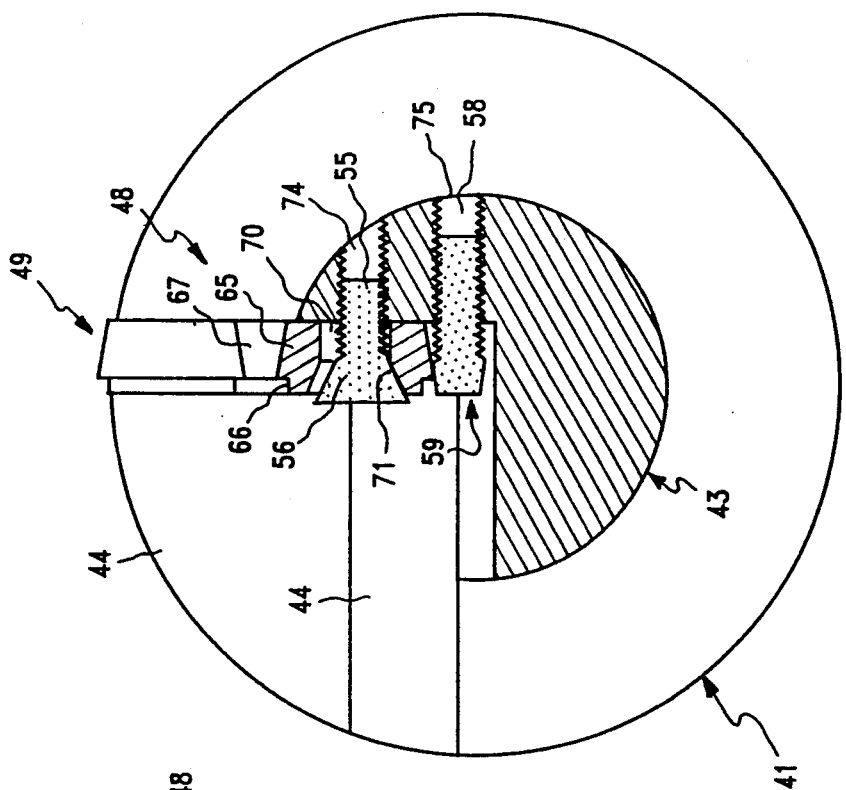
FIG. 5 is a sectional view of the porting tool head taken along line 5—5 of FIG. 4.

Referring also to FIGS. 4 and 5, the inserts 48 and 49 are attached in their respective notches 52 of the head 41 via an axial securement screw 54 and a peripheral adjustment and locking screw 57. The axial securement screw 54 is disposed axially with respect to the insert 48 or 49 and engages the insert 48 or 49 from its top face. The peripheral locking screw 57 is disposed adjacent the insert 48 or 49 and engages the insert 48 or 49 on its side edge or surface, from behind or below.

Figure 6:
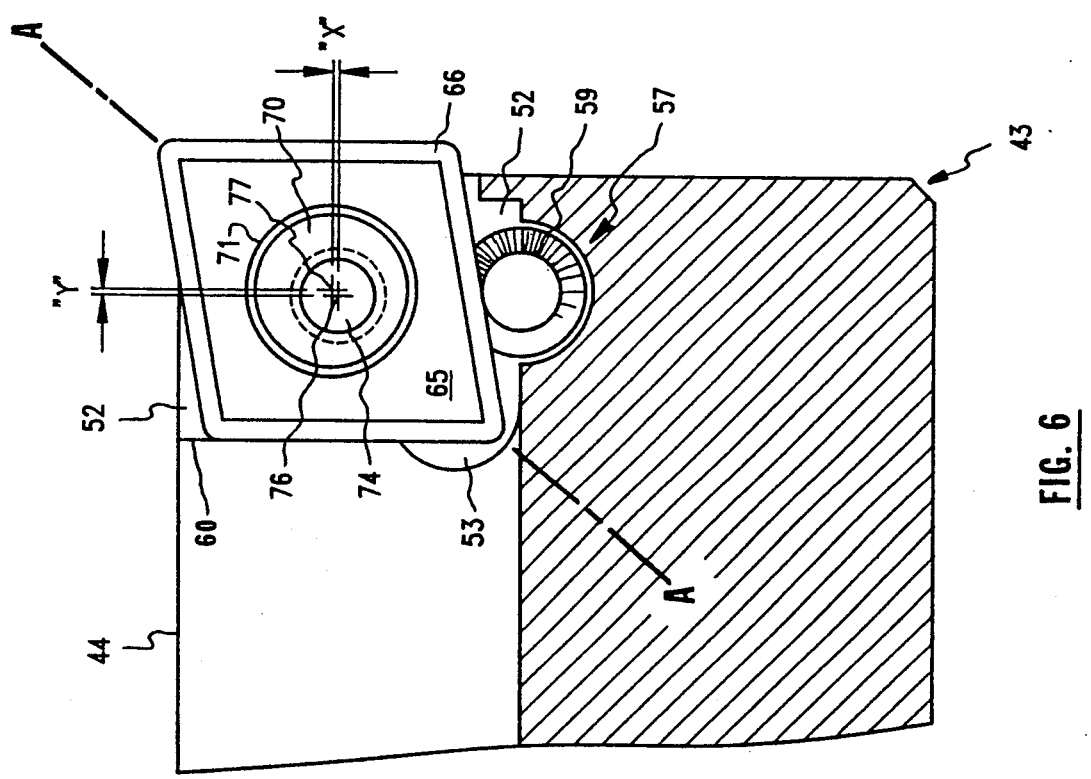
FIG. 6 is a side view, partially in section, of the porting tool head taken along line 6—6 of FIG. 3.

Referring also to FIG. 6, the axial securement screw 54 is mated with a threaded aperture 74 which is disposed generally centrally in the placement notch 52 bottom surface. The threaded aperture 74 is shown to extend entirely through the end extension 43, however, an aperture length sufficient to accommodate the extended portion of the securement screw 54 would be sufficient. The securement screw 54 has a threaded shaft portion 55 and a head 56 which has a tapered perimeter. The threaded shaft 55 has a diameter which is equivalent to that of the threaded aperture 74. The securement screw 54 is shown to extend through an aperture in the insert body 65, and then into the threaded aperture 74. The insert aperture has a lower portion 70 with a diameter equivalent to that of the threaded shaft 55 of the securement screw 54, and tapered upper or head portion 71 with a cross-sectional dimension equivalent to that of the securement screw tapered head 56.

Importantly, as shown in FIG. 6, the center or axis of the tapered head portion 71 of the insert aperture is off-center and non-coaxial with respect to the center axis of threaded aperture 74. The magnitude of the relative off-set distance along planes "X" and "Y" shown, is a function of a predetermined horizontal shift distance desired for the insert 48 as described further below. Basically, the inward shift distance of the insert 48, in cooperation with the remaining elements of the device, maximizes securement of the insert 48. In the instant embodiment, an off-set distance of approximately 0.005 inches (0.013 cm.) in each direction is shown which results in a net inward off-set distance of approximately 0.007 inches (0.018 cm.) along axis line A—A, which is spaced between side wall 60 and screw end 59.

As best shown in FIGS. 4 and 5, the adjustment and locking screw 57 is a set-type screw (no head) which has an elongated threaded shaft 58 and a tapered end 59. The tapered end 59 is shown to be angled inwardly approximately 10 degrees with respect to a longitudinal plane of the screw 57 to match the taper angle of the insert 48 side wall. The locking screw 57 is shown to extend through a threaded aperture 75 in the end extension 43 (or head portion 41) which is oriented spacially parallel to the securement screw aperture 74, a predetermined distance therefrom, so that it opens at the placement notch 52 at a point immediately adjacent the insert 48. Importantly, the locking screw tapered end 59 has a relatively narrow end portion and a wider base portion. In its operative position, the tapered end 59 extends from the aperture 75 and abuts the inwardly facing tapered side of the insert 48. The degree of extension of the locking screw 59 is adjustable, wherein the increasingly wider portions of the tapered end 59 urge the insert 48 outwardly as they come into contact the insert 48 tapered side. Outward movement of the insert 48 provides for precision adjustment and additionally accommodates for normal insert wear. The magnitude of insert 48 horizontal position adjustment is a function of the differential diameter of the locking screw tapered end 59 and the insert 48 side wall outward extension distance.

In use, the insert 48 is placed by the machinist on the notch 52 floor as shown in FIG. 6. Subsequently, the position of the locking screw 57 is adjusted so that its tapered end 59 contacts the side of the insert 48 and adjusts the position of the insert 48 on the positioning notch surface 52. Additionally, in such an orientation, movement of the insert 48 or 49 in the direction away from the open end of the placement notch 52 is resisted by both the end wall 60 of the notch 52 and by the locking screw end 59. Next, securement screw 54 is inserted through the insert central aperture 70, 71 and threaded into aperture 74 until the insert 48 is securely attached and locked in place. Initial contact between screw head 56 and insert aperture 71 occurs only along their inwardly facing portions. As the securement screw 54 is further actuated and migrates downwardly into threaded aperture 74, the insert 48 is forced inwardly as the screw head 56 tapered surface rides down on the beveled contacting surface of aperture 71. The inward force exerted on the insert 48 is opposed by the outwardly oriented, restraining forces exerted by the locking screw 57 and contact wall 60 on the insert 48, as discussed above. These opposing forces yield a secure attachment of the insert 48 to the head 4 which is able to withstand working stresses encountered during cutting processes and to remain in a steady position. Preferred machining tolerances in the range of 0.001–0.01 inch (0.003–0.03 cm.) are thereby maintained.

In summary, due to the relative off-set between the centers of apertures 70, 71 and 74, and the complementary tapered surfaces of the screw head 56 and aperture head 71, as the securement screw 54 is actuated, the insert 48 or 49 is forced inwardly between notch wall 60 and the locking screw end 59 along axis line A—A. The resulting frictional forces exerted between these surfaces yield a strong secure attachment of the insert 48 or 49 and the head 41. And, due to the variability of the effective width of the locking screw end 59, the positioning of the inserts 48 and 49 may be precisely adjusted.

As many changes are possible to the embodiments o this invention utilizing the teachings thereof, the descriptions above, and the accompanying drawings should be interpreted in the illustrative and not the limited sense.

That which is claimed is:

1. A machine tool head assembly for securely and adjustably attaching a separable cutting member thereto, comprising:

a) a tool head having a flat positioning surface disposed at a first end thereof, said positioning surface having a threaded aperture disposed at a predetermined position therein;

b) a cutting member being placeable on said positioning surface of said tool head and having a tapered aperture of a predetermined diameter and taper angle, and being generally centrally disposed thereon so that said tool head aperture and said cutting member aperture are non-coaxial when said cutting member is disposed on said positioning surface, said cutting member further having a tapered periphery of a predetermined taper angle;

c) an adjustable locking screw assembly including a threaded locking screw aperture of a predetermined length and of a uniform diameter throughout said length disposed in said positioned surface, adjacent said cutting member, and said locking screw aperture length extending entirely through said tool head, and a locking screw disposed in said locking screw aperture and having a threaded body of a predetermined length and of a uniform diameter throughout said length, a solid, frusto-conical tapered end with a taper surface inwardly disposed from said threaded body circumference at an angle equivalent to said cutting member periphery taper angle, and an actuation end with slot means disposed at an end opposite said tapered end, said locking screw tapered end being adjustably extendable from said locking screw aperture to movably abut said cutting member tapered periphery upon actuation of said locking screw at said actuation end to adjust the position of said cutting member on said positioning surface; and a securement screw securing said cutting member onto said positioning surface, said securement screw extending through said cutting member aperture and said tool head aperture whereby said cutting member is locked in said secured, adjusted position on said positioning surface.

* * * * *